United States Patent Office 3,118,844
Patented Jan. 21, 1964

3,118,844
PREPARATION OF CARBON BLACK
DISPERSIONS
Robert A. Forrester and Pritchard P. Ells, Baytown, Tex., assignors, by mesne assignments, to Ashland Oil & Refining Company, Ashland, Ky., a corporation of Kentucky
No Drawing. Filed July 13, 1960, Ser. No. 42,470
3 Claims. (Cl. 252—313)

This invention relates to synthetic rubber latices. More particularly, it relates to preparation of carbon black-synthetic rubber latex masterbatches. Still more particularly, it relates to an improved process for preparing an aqueous carbon black slurry for use in the preparation of such latex masterbatches.

Because carbon black is hydrophobic, the incorporation thereof in water constitues a problem. The finer the black, moreover, the more difficult the problem. It is possible to form dilute slurries, i.e., about 5% solids, by directly mixing black in water but as the solids content increases, the slurry rapidly thickens to an unmanageable paste. To permit the formation of more manageable higher solids content slurries, i.e., on the order of 15–20%, the use of dispersing agents, particularly certain sulfonic acid derivatives, has been generally practiced. Excellent foam-free dispersions are readily obtained with various commercially available dispersing agents of this type such as Tamol N (a sodium salt of condensed sulfonic acid), Daxad 11 (polymerized sodium salts of alkyl naphthalene sulfonic acids), Marasperse CB (a partially desulfonated sodium ligno-sulfonate), and the like. Nevertheless, the use of this type of dispersing agent has not been without certain disadvantages since it is generally believed that such use has an adverse effect, directly or indirectly, on the compounding characteristics of the rubber.

It has also been proposed to prepare carbon black slurries using various surfactants such as fatty acid soaps and/or disproportionated rosin acid soaps. Tires manufactured from masterbatches prepared with such black slurries have demonstrated an improved road-wear resistance of as much as 5% over those made from masterbatches prepared with black slurries containing the above described sulfonic acid type dispersing agents. This is probably due to the fact that the surfactant used in preparation of the black slurry is the same or similar to that employed in the emulsion polymerization system. Nevertheless, the use of surfactants has also not been without attendant disadvantages since excessive surface foaming as well as submerged foaming occurs. This renders their use in normal plant equipment impractical.

There has continued to remain, therefore, a demand for an improved process capable of providing a uniform dispersion of carbon black in water but which, at the same time, is not subject to the above described disadvantages. It is a principal object of this invention to provide such a process. It is a further object of this invention to provide a process for preparing an aqueous slurry of carbon black which employs the surfactants above described but without the heretofor attendant foaming problem. It is a still further object of this invention to provide a black slurry for use in the preparation of a black masterbatch having equal or superior properties to those manufactured from black slurries prepared with a dispersing agent or surfactants. An additional object of this invention is to provide a process which is simple, economical and readily practiced in standard plant equipment with a minimum of supervision.

Surprisingly, these objects have been met in a simple yet unusually effective manner. In general, the process of this invention comprises agitating an aqueous slurry comprising carbon black, a soap-type surfactant and a water-soluble hydroxide selected from the group consisting of the alkali metal and ammonium hydroxides. This general procedure has been found to readily provide a uniform, foam-free, high solids content carbon black slurry of manageable viscosity useful in the preparation of black masterbatches of outstanding properties.

By the practice of the present process, it has been found that the advantages inherent in the use of a soap-type surfactant in the formation of aqueous black slurries can be retained while overcoming the disadvantage therein, i.e., foaming, which has heretofor rendered such use impractical from a plant equipment standpoint. The preferred procedure according to this invention by which these results are obtained comprises adding carbon black and water to a solution of a water-soluble hydroxide with agitation at such rates as to produce a slurry having a carbon black solids content running as high as 20–25% by weight and a water-soluble hydroxide content varying from about 0.1–1.0% on the weight of carbon black. Naturally, the more hydroxide employed the greater will be the acid requirements in the subsequent coagulation step. Usually, therefore, the hydroxide employed will be less than about 0.75%, preferably in the range of about 0.2–0.4%. During this stage of the process, a considerable volume of air is discharged into the water as the micropulverized black is added. Presence of hydroxide in the agitated solution permits the more rapid wetting of black than is obtainable in the absence of hydroxide. As the suspension is formed, moreover, agitation expels air with no associated foam build-up. If a soap-type surfactant were present in solution during this stage of the process, the air introduced as the black is charged with result in the excessive formation of an unusually stable foam.

Once the carbon black has been substantially all added and thoroughly wetted, a solution of a soap-type surfactant is added. The amount added is that usually employed in the conventional method of forming a slurry using a soap-type surfactant, i.e., some 1.0–2.5% on the weight of the black, usually about 2%. Similarly, the soap is added as about a 20–25% aqueous solution as is conventionally done. The soap may be added in various ways but is preferably introduced below the liquid level, as into pumps or through submerged agitators, the slurry being simultaneously violently agitated.

Alternatively, the process may be practiced by adding the black to water which is free of water soluble hydroxide. Also added to the water, preferably before addition of the black, is the free acid of a soap-type surfactant. This acid is subsequently converted in situ to the soap by the addition of a water-soluble hydroxide. In this procedure, the hydroxide is preferably added after the black has been introduced but just prior to subjecting the slurry to violent agitation. The amounts of acid and water-soluble hydroxide employed will be such as to provide ultimate soap and hydroxide concentrations within the ranges heretofore specified when practicing the separate additions. In the practice of this alternative, the acid employed will either be one that is normally liquid at the processing temperature, or else it and/or the slurry will be heated to give it sufficient fluidity.

By soap-type surfactant as employed herein is meant those water-soluble soaps and mixtures thereof generally employed as emulsifiers in emulsion polymerization systems. Illustrative of such soaps are the water-soluble salts of monocarboxylic acids such as caprylic, lauric, myristic, palmitic, stearic, oleic and the like; water soluble salts of rosin acids including hydrogenated, dehydrogenated and disproportionated rosin acids such as abietic acid, dehydroabietic acid and the like; and mixtures of water soluble salts of such acids as might be derived, for example, from tall oil. By water-soluble salt as employed herein is meant ammonium and the alkaline earth metal as well as alkali metal salts. When forming the soap in situ, of course, the free acids above mentioned will be employed.

The process of this invention is particularly directed to forming aqueous slurries of carbon black employing those carbon blacks generally referred to as highly reinforcing blacks. Nevertheless, the process is just as applicable to forming slurries of any of the various grades of black produced by any means. Similarly, while the primary purpose for preparing the aqueous slurries according to the process of this invention is for incorporation into styrene-butadiene latices, aqueous slurries thus prepared may just as readily be employed in the preparation of other synthetic latex masterbatches.

By the practice of the present invention, it is possible to obtain all the advantages of black slurry preparation using a soap-type surfactant while minimizing the disadvantage of foaming usually associated with such use.

The process is further described by the following examples which are intended to be illustrative only and not by way of limitation. Unless otherwise noted, all parts are by weight.

EXAMPLE 1

20 parts of HAF carbon black is added to 100 parts of water containing 0.4 part of sodium hydroxide. The resultant slurry is quite viscous but free of foam. To this foam-free viscous slurry is added beneath its surface and with mild agitation 0.4 part of sodium stearate as a 20% aqueous solution. The resultant slurry comprises a uniform suspension of carbon black in water having a viscosity permitting ready handling in conventional equipment. The suspension is unusually stable with exceptionally low drop out of carbon black even when stored under conditions of no agitation.

EXAMPLE 2

The procedure of Example 1 is repeated replacing the sodium hydroxide with equivalent weights of potassium and ammonium hydroxides. In each instance slurries having similar properties is obtained.

EXAMPLE 3

The procedure of Example 1 is repeated except that the HAF black is replaced by ISAF black and the sodium stearate by an equivalent weight of Dresinate 214 (a sodium salt of a disproportionated rosin acid). A slurry of similar properties is obtained.

EXAMPLE 4

The procedure of Example 1 is repeated except that the sodium stearate is formed in situ by initially adding sufficient stearic acid and subsequently sufficient sodium hydroxide to provide 0.4 part of sodium stearate and 0.4 part of sodium hydroxide. A slurry of similar properties is obtained.

EXAMPLE 5

The slurry of Example 1 is continuously fed into a styrene-butadiene latex at such a rate as to provide 50 parts of carbon black to 100 parts of polymer. The black-latex masterbatch is coagulated by the usual salt-acid procedure and further processed in conventional means to produce a black-rubber masterbatch.

EXAMPLE 6

The procedure of Example 1 is repeated except that the carbon black is added to an aqueous solution containing 1.2% on the weight of the black of Marasperse CB (a partially desulfonated sodium lignosulfonate) to obtain a uniform dispersion of black in water. This slurry is then added to an SBR latex as in Example 5 and processed as therein to produce a black-latex masterbatch.

EXAMPLE 7

Samples of the masterbatches of Examples 5 and 6 are compounded according to the following recipe.

| Constituent: | Parts |
| --- | --- |
| Masterbatch | 150 |
| Zinc oxide | 3.0 |
| Stearic acid | 2.0 |
| Sulfur | 1.75 |
| Antioxidant | 1.0 |
| N-cyclohexylbenzothiazole-2-sulfenamide | 0.8 |
| Diphenylguanidine | 0.2 |

These samples are then cured at 287° F. for 30, 45, 60 and 90 minutes. The cured samples are then subjected to testing. Results appear in the following table.

*Table 1*

| Test | Min. | Ex. 5 | Ex. 6 |
| --- | --- | --- | --- |
| Modulus (p.s.i.) | 30 | 880 | 750 |
|  | 45 | 1,580 | 1,560 |
|  | 60 | 1,900 | 1,930 |
|  | 90 | 2,220 | 2,150 |
| Tensile (p.s.i.) | 30 | 2,370 | 2,300 |
|  | 45 | 3,080 | 3,300 |
|  | 60 | 3,180 | 3,550 |
|  | 90 | 3,380 | 3,400 |
| Elongation (percent) | 30 | 640 | 640 |
|  | 45 | 500 | 515 |
|  | 60 | 440 | 480 |
|  | 90 | 420 | 420 |
| Angle Abrasion (grams loss/hr.) | 90 | 13.9 | 15.1 |

The above data show the product produced using a black slurry prepared according to this invention (Ex. 5) to have better angle abrasion resistance and otherwise to have properties equivalent to the product produced using a black slurry prepared using a sulfonic acid derivative type dispersing agent (Ex. 6).

Although the above examples illustrate various blacks, hydroxides and soaps in certain concentrations that are representative of this invention, other blacks, hydroxides and soaps in other concentrations and combinations may just as readily be employed.

We claim:

1. A process of preparing a substantially foam-free, high solids content and stable aqueous carbon black dispersion in which carbon black is uniformly dispersed throughout, which comprises: agitating a mixture that is free of sulfonated organic dispersing agents, and which contains water, carbon black, about 0.1–1.0% by weight on the carbon black of sodium hydroxide and about 1.0–2.5% by weight on the carbon black of sodium salt of disproportionated rosin acid.

2. A process in accordance with claim 1 wherein said mixture is produced by first mixing the water, carbon black and sodium hydroxide, followed by addition of said salt.

3. A process in accordance with claim 1 wherein said mixture is produced by first mixing the water, carbon black and free rosin acid, followed by addition of sodium hydroxide in sufficient amount to provide a hydroxide content of 0.1–1.0% after conversion of the rosin acid to said salt.

References Cited in the file of this patent

UNITED STATES PATENTS

| 2,965,510 | Carroll et al. | Dec. 20, 1960 |
| 3,021,226 | Kraus et al. | Feb. 13, 1962 |